United States Patent [19]

Neubert

[11] Patent Number: 5,073,585

[45] Date of Patent: Dec. 17, 1991

[54] AQUEOUS COATING MATERIALS BASED ON SECONDARY DISPERSIONS OF CARBOXYL-CONTAINING COPOLYMERS OF ACRYLATES OR METHACRYLATES

[75] Inventor: Gerhard Neubert, Battenberg, Fed. Rep. of Germany

[73] Assignee: BASF Aktiengesellschaft, Ludwigshafen, Fed. Rep. of Germany

[21] Appl. No.: 231,398

[22] Filed: Aug. 12, 1988

[30] Foreign Application Priority Data

Aug. 14, 1987 [DE] Fed. Rep. of Germany ....... 3727112

[51] Int. Cl.$^5$ ................................. C08K 5/51
[52] U.S. Cl. .................... 524/139; 524/424; 524/425; 524/427; 524/435; 524/436; 524/437; 524/446
[58] Field of Search ............... 524/139, 424, 425, 427, 524/435, 436. 437, 446

[56] References Cited

U.S. PATENT DOCUMENTS

| | | | |
|---|---|---|---|
| 2,997,454 | 8/1961 | Leistner et al. | 524/139 |
| 4,223,115 | 9/1980 | Zalucha et al. | 524/139 |
| 4,372,870 | 2/1983 | Snyder et al. | 524/139 |
| 4,604,414 | 8/1986 | Kato et al. | 524/139 |

*Primary Examiner*—Joseph L. Schofer
*Assistant Examiner*—J. M. Reddick
*Attorney, Agent, or Firm*—Oblon, Spivak, McClelland, Maier & Neustadt

[57] ABSTRACT

Aqueous coating materials are based on a mixture of
 (A) an aqueous secondary dispersion of carboxyl-containing copolymers of acrylates or methacrylates having an acid number of from 15–150 and a K value of 22–50, as a binder,
 (B) not less than 5% by weight, based on the binder (A), of pigments and/or fillers, each of which contains or consists of a calcium compound or magnesium compound, and
 (C) 0.1–10% by weight, based on the components (B), of a monoester of phosphoric acid whose alcohol component is derived from an alkoxylated $C_4$–$C_{24}$-alcohol, phenol or an alkylphenol, the concentration of the components (B) being from 2–70% by volume, based on the solids of (A) and (B).

8 Claims, No Drawings

AQUEOUS COATING MATERIALS BASED ON SECONDARY DISPERSIONS OF CARBOXYL-CONTAINING COPOLYMERS OF ACRYLATES OR METHACRYLATES

Compared with coatings which contain, as binders, copolymers which are soluble in organic solvents, coatings prepared using the conventional aqueous primary dispersions as binders swell relatively rapidly and considerably under the action of moisture, with absorption of water, and thus become permeable to corrosive substances, such as oxygen, carbon dioxide, sulfur dioxide and salts. The coating films thus substantially lose their protective function for the material underneath and the adhesion to the said material and then offer only little resistance to mechanical stress. Such coatings are therefore generally unsuitable, or of only limited suitability, for protecting metals and many other materials from weather-related corrosion, or for coatings for marking roads and the like. For applications where severe corrosion may occur, aqueous coating materials based on primary dispersions have therefore not in general been able to compete successfully with the coating materials dissolved in an organic solvent.

European Patent 91,012 and German Laid-Open Application DOS 3,543,361 disclose aqueous secondary dispersions which, when used in aqueous coating materials, do not have the disadvantages resulting from the use of the primary dispersions. However, problems of a different nature are encountered in the preparation of aqueous coating materials containing pigments and fillers and based on known secondary dispersions. In many cases, the components become incompatible with water only a short time after the preparation of the pigmented aqueous coating materials, so that coagulation and the formation of two phases occur. In other cases, incompatibility with water develops only after prolonged storage of the aqueous pigmented coating materials and in this case too results in the coating materials becoming useless. This serious disadvantage is all the more evident the higher the acid number of the binder (e.g. greater than 40) and the higher the K value of the copolymer (e.g. above 22). These disadvantages furthermore cannot be overcome by treating the pigments and fillers with a known dispersant based on low molecular weight polyacrylates or salts of polyphosphoric acid. The presence of such pigment dispersants in pigmented coating materials based on secondary dispersions leads instead to a further reduction in the stability of the coating materials compared with the dispersant-free coating materials. For the preparation of aqueous coating materials based on secondary dispersions, it is therefore necessary to rely on coating materials which are unpigmented or have a low pigment content or on pigments and fillers which are completely inert to the binder, such as iron oxide red, barite and specific rutile types. Only in these cases are aqueous coating materials which have a sufficiently long shelf life obtained. Since most pigments or fillers contain impurities of calcium compounds or magnesium compounds which react with binders of coating materials, their use in coating materials adversely affects the stability of the mixtures.

It is an object of the present invention to provide pigmented, aqueous coating materials based on secondary dispersions and having an improved shelf life compared with the known coating materials. It is a further object of the present invention to provide pigmented, aqueous coating materials which give coatings whose protective properties with respect to corrosive environmental effects are improved compared with the known materials.

I have found that this object is achieved, according to the invention, by aqueous coating materials based on secondary dispersions of carboxyl-containing copolymers of acrylates or methacrylates, pigments or fillers and, if required, conventional assistants, if the coating materials contain (A) an aqueous secondary dispersion of a carboxyl-containing copolymer of an acrylate or methacrylate having an acid number of from 15 to 150 and a K value of from 22 to 50, as the binder, (B) not less than 5% by weight, based on the solids content of the binder (A), of pigments and/or fillers, each of which contains or consists of a calcium compound or magnesium compound, and (C) 0.1–10% by weight, based on the components (B), of a monoester of phosphoric acid whose alcohol component is derived from a compound of the formula

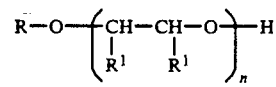

where R is $C_4$-$C_{24}$-alkyl, phenyl or $C_1$-$C_{18}$-alkylphenyl, $R^1$ is H, $CH_3$ or $C_2H_5$ and n is from 1 to 50, as a dispersant, the volume concentration of the components (B) being from 2 to 70% by volume, based on the solids of (A) and (B).

The advantage of the novel coating materials compared with conventional aqueous coating materials based on aqueous primary dispersions of polymers is attributable in particular to the better resistance of the coatings to swelling in water and the resulting improved protection for the materials coated therewith against weather-related and other corrosive effects, for example due to salt spray mist, and the better stability of the coatings under the simultaneous action of weather-related and mechanical stresses. Compared with the known aqueous pigmented coating materials based on secondary dispersions, the novel coating materials surprisingly have a decisively improved shelf life. In particular, it is also possible to prepare highly pigmented coating materials having a long shelf life.

The binders (A) used are aqueous secondary dispersions of carboxyl-containing copolymers of acrylates or methacrylates having an acid number of 15–150, preferably 20–80, in particular 25–50, and a K value of 22–50, preferably 28–40. The preparation of such binders is described in, for example, European Patent 91,021 and German Laid-Open Application 3,543,361. The binders (A) are obtainable, for example, by copolymerization of (a) 80–98.5% by weight of one or more esters of acrylic acid or methacrylic acid with a straight-chain or branched monoalcohol of 1 to 20 carbon atoms, where up to 65% by weight of these acrylates or methacrylates can be replaced by vinylaromatics, in particular styrene, copolymerizable vinyl esters of 4 to 14 carbon atoms or copolymerizable olefinically unsaturated dicarboxylic diesters of 6 to 32 carbon atoms, (b) 1.5–20% by weight of one or more copolymerizable, olefinically unsaturated organic compounds of 3 to 10 carbon atoms having one or more carboxyl or carboxylic anhydride groups and (c) 0–30% by weight of further copolymerizable olefinically unsaturated organic compounds which are not stated under (a) and (b) and have a hydrophilic group, with the proviso that the sum of the percentages stated under (a) to (c) is 100 and the copolymerization is carried out in an organic solvent which is partially or completely miscible with water, the resulting copolymer is dispersed in water with the addition of ammonia or an amine, and, if necessary, the excess solvent is then distilled off.

Suitable components (a) are esters of acrylic acid or methacrylic acid with a straight-chain or branched monoalcohol of 1 to 20 carbon atoms, e.g. methyl acrylate, ethyl acrylate, isopropyl acrylate, methyl methacrylate, n-butyl acrylate, n-butyl methacrylate, isobutyl acrylate, isobutyl methacrylate, tert-butyl acrylate, 2-ethylhexyl acrylate, 2-ethylhexyl methacrylate, lauryl acrylate and mixtures of the stated esters. n-Butyl acrylate, isobutyl acrylate and 2-ethylhexyl acrylate are preferably used.

Suitable vinylaromatics, which may replace some of the acrylates and methacrylates, are, for example, styrene and vinyltoluene. The vinylaromatics may replace up to 65, preferably from 20 to 50, % by weight of the (meth)acrylates. Some of the (meth)acrylates may furthermore or be replaced by vinyl esters of 4 to 14 carbon atoms or by copolymerizable olefinically unsaturated dicarboxylic diesters of 6 to 32 carbon atoms. Examples of suitable vinyl esters are vinyl acetate and vinyl propionate, and examples of suitable dicarboxylic diesters are those of maleic acid, e.g. di-n-butyl maleate or diisobutyl maleate. The component (a) preferably consists of a mixture of one or more monomers which impart hardness, such as methyl methacrylate, isobutyl methacrylate, tert-butyl acrylate or styrene, and one or more plasticizing monomers, for example acrylates of $C_2$–$C_{18}$-monoalcohols.

Suitable components (b) are copolymerizable, olefinically unsaturated organic compounds of 3 to 10 carbon atoms which contain one or more carboxyl or carboxylic anhydride groups, for example acrylic acid, methacrylic acid, maleic acid or itaconic acid, and the anhydrides or half-esters of these dicarboxylic acids. Before neutralization with ammonia, the anhydride groups of the copolymers can be converted into the corresponding copolymers containing half-ester groups, for example by heating with glycol ethers or alcohols of 1 to 8 carbon atoms. Examples of such alcohols and glycol ethers are ethanol, isopropanol, butanol and butylglycol. Preferably used monomers of component (b) are acrylic acid, itaconic acid and maleic anhydride. The monomers of component (b) are present as copolymerized units in an amount of 1.5–20, preferably 2–9, % by weight.

Suitable components (c) of the copolymers are copolymerizable, olefinically unsaturated organic compounds which are not stated under (a) and (b) and possess a hydrophilic group. These are, for example, monoacrylates and monomethacrylates of alkanediols, e.g. hydroxyethyl acrylate, hydroxyethyl methacrylate, hydroxypropyl acrylate, hydroxypropyl methacrylate, butanediol monoacrylate and butanediol monomethacrylate, as well as acrylamide, methacrylamide, acrylonitrile and methacrylonitrile.

Copolymers which are particularly preferably used as binders (a) are obtained if the abovementioned monomers (a) to (c) are subjected to copolymerization in a specific manner. This gives a copolymer which consists of from 25 to 75% by weight of a component I and from 25 to 75% by weight of a component II, the sum of the percentages stated under I and II being 100. Component I is a copolymer which contains, as copolymerized units, (a) 80–98.5% by weight of one or more esters of acrylic or methacrylic acid with a monoalkanol of 1 to 20 carbon atoms without further functional groups, where up to 65% by weight of these acrylates or methacrylates may be replaced by vinylaromatics, (b) 1.5–20% by weight of one or more copolymerizable, olefinically unsaturated organic compounds of 3 to 10 carbon atoms having one or more carboxyl or carboxylic anhydride groups and (c) 0–30% by weight of further copolymerizable, olefinically unsaturated organic compounds which are not stated under (a) and (b) and are free of carboxyl and carboxylic anhydride groups, the sum of the percentages stated under (a) to (c) always being 100. These components of the copolymer correspond to the copolymer disclosed in European Patent 91,021. The binder (A), however, preferably furthermore contains a component II, which is a copolymer composed exclusively of the comonomers of groups (a) and (c). It is important that one of the two components I or II is first polymerized in an organic solvent or in the absence of a solvent, and the other component is then subjected to copolymerization in the resulting polymer solution or melt of the polymer. The resulting mixture of the copolymers of components I and II is then dispersed in water with the addition of ammonia or an amine. If necessary, the excess organic solvent is distilled off. The copolymers from which the binders (a) are derived are prepared by polymerization in the absence of a solvent or by solution polymerization. Polymerization is particularly preferably carried out in the presence of some or all of the completely water-miscible organic solvent required until the copolymers dissolve. The polymerization can also be carried out in an aromatic hydrocarbon, for example in toluene or xylene. These inert solvents are emulsified in water during dissolution of the polymers. Excess solvent which remains in the dispersion or in the solution can subsequently serve as film-forming assistants during film formation by the novel coating materials. Examples of solvents of this type are relatively high boiling aromatics having a boiling range of from about 120° to 220° C. and, preferably, water-miscible solvents, such as butylglycol, butyldiglycol, methoxypropanols, isopropoxypropanols and n-propanol.

The secondary dispersions are prepared from the solutions or melts of the copolymers. The solids content of the polymer solutions is preferably from 60 to about 90% by weight. These copolymer solutions and the polymer melts are then mixed with ammonia or an amine, e.g. trimethylamine, triethylamine or dimethylethanolamine, and dispersed or dissolved in water. This gives stable dispersions or solutions having a pH of from 7.0 to more than 10. The solids content of the dispersions is about 25–60% by weight. If dispersions having a particularly low content of organic solvent are desired, the organic solvent present in the dispersions can be distilled off azeotropically. The solids content of the aqueous copolymer solutions is from 5 to 40% by weight.

The aqueous coating materials contain, as component (B), not less than 5% by weight, based on the solids content of the binders (A), of pigments and/or fillers, each of which contains or consists of a calcium compound or magnesium compound. These pigments and fillers are naturally occurring calcites or dolomites, chalk, precipitated calcium carbonate or synthetic pigments, e.g. calcium ferrites or calcium molybdates, or calcium oxide-modified aluminates, silicates or aluminum silicates. With the exception of pigments and fillers based on zinc oxide and its salts, coating materials having a long shelf life can be prepared using all conventional pigments and fillers. Suitable components (B) are all pigments and fillers which contain a sufficient amount of calcium and/or magnesium compounds to neutralize not less than 20% of the carboxyl groups in the binder (A).

Finely divided substances (B) which are rich in calcium or magnesium at the particle surface do of course coagulate the anionic binder (A) more rapidly and more completely than coarse substances of the said type. Accordingly, relatively large amounts of the pigment dispersant (C) used according to the invention are also required for this purpose in order to ensure the desired shelf life of the novel coating materials. The calcium or magnesium ions present at the particle surface react with the carboxyl groups of the binder (A) with crosslinking.

The aqueous coating materials contain, as component (C), 0.1-10, preferably 0.5-5, % by weight of monoesters of phosphoric acid whose alcohol component is derived from a compound of the formula

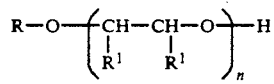

where R is $C_4$-$C_{24}$-alkyl, phenyl or $C_1$-$C_{18}$-alkylphenyl, $R^1$ is H, $CH_3$ or $C_2H_5$ and n is from 1 to 50.

These monoesters of phosphoric acid have acid numbers of 50-600, preferably 110-450, in particular 200-350, according to DIN 53,402. It is particularly preferable to use monoesters of phosphoric acid whose alcohol component is derived from a compound of the formula

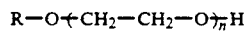

where R is $C_6$-$C_{18}$-alkyl and n is from 3 to 25.

The phosphoric acid from which the said monoesters are derived can be condensed proportionately to give di- or triphosphoric acid. However, it is important that on average about 1 polyalkoxyalkyl ether radical is present per phosphorus atom. The dispersants (C) are preferably used in amounts of 0.5-5, in particular 0.7-3.0, % by weight, based on the components (B) of the aqueous coating material. Other dispersants otherwise usually used for pigment dispersing and based on low molecular weight polycarboxylic acids or on salts of polyphosphoric acid can be present in amounts of not more than about 0.1% by weight, based on (B). In fact, as soon as the aqueous coating materials contain larger amounts of these dispersants, the shelf life of the coating materials is adversely affected.

In specific cases, the novel coating materials can be prepared by dispersing the pigments and fillers by conventional methods in a mixture of components (A) and (C). However, a preferred procedure is one in which an aqueous suspension of pigments or fillers (B) is first prepared in the presence of dispersant (C) and the binder (A) is then incorporated into the resulting suspension. This gives pigmented, aqueous coating materials in which the pigment volume concentration is 5-70, preferably 18-45, %. Particularly preferred aqueous coating materials are those whose pigment volume concentration is from 25 to 35%.

Suitable neutralizing agents for the monoesters of phosphoric acid are the bases conventionally used for this purpose. Ammonia or a tertiary amine, such as triethylamine, is preferably used.

In addition to the binder (A), the coating materials may contain, as binders, other known binders which are compatible with (A), in proportionate amounts instead of (A). Examples of such known binders are primary dispersions based on acrylate copolymers or water-dilutable alkyd resins. Up to 70% by weight of the binder (A) may be replaced by other known aqueous binders compatible with (A).

The novel coating materials may contain, as further assistants, the additives otherwise conventionally used for aqueous coating materials, for example antifoams, thickeners, film-forming assistants or plasticizers or solvents. The amounts of these products are not more than 40%, based on the component (A).

The novel coating materials are used as anti-corrosion paint, for example for antirust primers, anti-corrosion leveling primers and anticorrosion top coats or as road marking paints. They undergo crosslinking after application to a substrate, the crosslinking reaction taking place relatively slowly at room temperature but being accelerated at elevated temperatures. The dry coatings have limited solvent resistance and can therefore be more readily overcoated with solvent-containing coating materials and exhibit reduced thermoplasticity and susceptibility to cracking under weather-related stress as well as improved resistance to swelling in water and better corrosion protection for metals and other materials.

The K values of the copolymers were measured according to H. Fikentscher, Cellulose-Chemie, 13 (1932), 48-64 and 71-74, in tetrahydrofuran at 25° C. and at a polymer concentration of 1% by weight; $K=k.10^3$.

The acid numbers wre measured according to DIN 53,402 and are expressed in mg KOH/g of copolymer. In the Examples, parts are by weight.

EXAMPLE 1

15 parts of micronized iron oxide black (mean particle diameter about 0.002 mm), 25 parts of microcalcite (mean particle diameter 0.002 mm) and 25 parts of micronized iron oxide red (mean particle diameter about 0.002 mm)

are stirred, in succession, into an aqueous solution which is obtained by mixing 25 parts of water, 5 parts of butyldiglycol, 1 part of a monoester of phosphoric acid having an acid number of 270, obtained by esterification of phosphoric acid with the adduct of 6 moles of ethylene oxide with 1 mole of isodecanol, 1 part of concentrated ammonia, 2 parts of a commercial antifoam and 0.2 part of an associative commercial thickener based on polyurethane, and which has a pH greater than 9, and are dispersed in a dissolver for 20 minutes.

A total of 100 parts of 45% strength aqueous ammoniacal dispersion (binder 1) are introduced a little at a time into the resulting pigment suspension and thoroughly mixed.

The binder 1 is prepared by the method stated in Example 1 of German Laid-Open Application DOS 3,543,361, by running a mixture of 228 parts of styrene, 300 parts of n-butyl acrylate, 72 parts of acrylic acid, 18 parts of tert-butyl peroctoate and 90 parts of ethanol uniformly into an initially taken amount of 120 parts of ethanol in the course of 2.5 hours at 80° C. in a conventional stirred apparatus and polymerizing the mixture for a further 2 hours at 80° C. after the addition of the monomers is complete.

Thereafter, a mixture of 228 parts of styrene, 312 parts of butyl acrylate, 18 parts of tert-butyl peroctoate and 90 parts of ethanol are added at 80° C. in the course of 2 hours and the reaction mixture is then polymerized for a further 4 hours at 80° C. 63.3 parts of 25% strength aqueous ammonia solution and 1,100 parts of water are then added and an ethanol/water mixture is distilled off under reduced pressure. During the distillation itself, water is added in an amount such that, after removal of the ethanol, an aqueous dispersion having a solids content of 45% by weight is obtained.

By mixing the aqueous solution of the monoester of phosphoric acid with the pigments and the binder 1, as described above, an aqueous coating material having a pigment volume concentration of about 29% is obtained. A further 0.2% by weight, based on the total mixture, of a commercial antifoam is added, as well as the abovementioned commercial thickener in an amount such that the aqueous coating material has a viscosity of 1.5 pas (measured using an ICI Rotothinner sphere).

EXAMPLES 2-6

Further aqueous coating materials which can be used as anticorrosion paints are prepared as described in Example 1, using the same raw materials but the pigments and fillers stated in the Table below and modified amounts of dispersants and wetting agents:

| Example No. | Mean particle diameter [μm] | 2* | 3* | 4* | 5* | 6* | Comparative Example 1* |
|---|---|---|---|---|---|---|---|
| Calcium ferrite | 2 | 33 | 33 | | | | |
| Calcium molybdate | 2 | | | 10 | | | |
| Rutile | 3 | | | 20 | 20 | 20 | |
| Microcalcite | 3 | 28 | 28 | | 28 | 28 | |
| Microdolomite | 5 | | | 28 | | | |
| Iron oxide red | 2 | | | | | | 40 |
| Barite | 5 | | | | 20 | 20 | 44 |
| Binder 1 | | 100 | 100 | 100 | 100 | 180 | 100 |
| Monoester of phosphoric acid | | 0.8 | 2 | 2 | 1 | 1 | 0.8 |

* = [Parts]

All paints have a shelf life of months at room temperature and do not coagulate.

The paints having the higher content of the monoester have a lower viscosity and can therefore be subsequently thickened with a larger amount of urethane thickener. They have high viscosities at high shear gradients and are therefore more suitable for processing by the brushing method.

To test the anticorrosion coatings, the paints of Examples 1 to 6 are applied pore-free to a degreased deep-drawn sheet to give a film which is 0.08 mm thick when dry, and is dried for 1 week at 23° C. and 65% relative humidity or for 24 hours at 50° C. The paint prepared according to Comparative Example 1 is tested in a similar manner.

According to these tests, the coatings obtained with paints 1 to 6 do not dissolve under the action of organic solvents, e.g. n-propanol, butyl acetate or xylene, in contrast to coats of comparative paint 1. They are merely softened and surface-swollen by solvents but do not wrinkle or rise due to skin formation on the surface, as is familiar for oxidatively crosslinking coating materials.

The thoroughly dried coatings of the novel coating materials can therefore be more readily overcoated with solvent-containing coating materials. Coat damage, such as rising or detachment of the primer coat during overcoating can thus be avoided.

The coatings produced above on the deep-drawn sheets are cut and then subjected to a comparative salt spray test according to DIN 53,167 (≙ISO 7253/1984) for 300 hours. According to this test, the underpenetration and underrusting at the cut is less pronounced the greater the content of the pigments or fillers forming calcium ions or magnesium ions in the coat. The coat of the comparative paint according to Comparative Example 1 provides relatively little protection.

COMPARATIVE EXAMPLE 2

The coating material described in Example 1 is prepared without the addition of the wetting agent, by admixing half the binder dispersion before the addition of the pigments and fillers, as a pigment wetting aid. The ready-prepared paint is unstable and coagulates soon after its preparation.

COMPARATIVE EXAMPLE 3

The procedure is similar to that described in Example 1, except that the monoesters of phosphoric acid is replaced by 0.8 or 0.4 part of a conventional low molecular weight ammonium polyacrylate as the dispersant.

The paints coagulate within a few hours or days, the paint having the higher wetting agent concentration thickening more rapidly and becoming useless.

COMPARATIVE EXAMPLE 4

The procedure is the same as that employed in the preparation of the coating material according to Example 1, except that, instead of the monoester of phosphoric acid, ammonium polyphosphate is used as the dispersant. The resulting paint is unstable.

I claim:
1. An aqueous coating material, which contains
   (A) an aqueous secondary dispersion of a carboxyl-containing copolymer of an acrylate or methacry- late having an acid number of from 15 to 150 and a K value of from 22 to 50, as the binder, (B) not less than 5% by weight, based on the solids content of the binder (A), of pigments, and mixtures thereof, each of which contains a calcium compound or magnesium compound, and (C) 0.1-10% by weight, based on the components (B), of a monoester of phosphoric acid whose alcohol component is derived from a compound of the formula

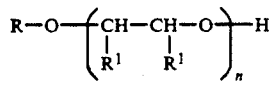

where R is $C_4$-$C_{24}$-alkyl, phenyl or $C_1$-$C_{18}$-alkylphenyl, $R^1$ is H, $CH_3$ or $C_2H_5$ and n is from 1 to 50, as a dispersant, the volume concentration of the components (B) being from 2 to 70% by volume, based on the solids of (A) and (B).

2. An aqueous coating material as claimed in claim 1, wherein the binder (A) is prepared by copolymerization of (a) from 80 to 98.5% by weight of one or more esters of acrylic acid or methacrylic acid with a straight-chain or branched monoalcohol of 1 to 20 carbon atoms, where up to 65% by weight of these (meth)acrylates can be replaced by vinylaromatics, copolymerizable vinyl esters of 4 to 14 carbon atoms or copolymerizable olefinically unsaturated dicarboxylic diesters of 6 to 32 carbon atoms, (b) from 1.5 to 20% by weight of one or more copolymerizable, olefinically unsaturated organic compounds of 3 to 10 carbon atoms having one or more carboxyl or carboxylic anhydride groups and (c) from 0 to 30% by weight of further copolymerizable olefinically unsaturated organic compounds which are not stated under (a) and (b) and have a hydrophilic group, with the proviso that the sum of the percentages stated under (a) to (c) is 100 and the copolymerization is carried out in an organic solvent which is partially or completely miscible with water, the resulting copolymer is dispersed in water with the addition of ammonia or an amine.

3. An aqueous coating material as claimed in claim 1, wherein the binder (A) consists of 25 to 75% by weight of a component I and from 25 to 75% by weight of a component II, the sum of the percentages stated under I and II being 100, component I is a copolymer which contains, as copolymerized units, (a) from 80 to 98.5% by weight of one or more esters of acrylic or methacrylic acid with a monoalcohol of 1 to 20 carbon atoms without further functional groups, where up to 65% by weight of these acrylates or methacrylates can be replaced by vinylaromatics, (b) from 1.5 to 20% by weight of one or more copolymerizable, olefinically unsaturated organic compounds of 3 to 10 carbon atoms having one or more carboxyl or carboxylic anhydride groups and (c) from 0 to 30% by weight of further copolymerizable, olefinically unsaturated organic compounds which are not stated under (a) and (b) and are free of carboxyl and carboxylic anhydride groups, the sum of the percentages stated under (a) to (c) always being 100, and component II is a copolymer composed exclusively of the comonomers (a) and (c), with the proviso that one of the two components I or II is first polymerized in an organic solvent and the other component is then polymerized in the resulting polymer solution, the resulting mixture of I and II is then dispersed in water with the addition of ammonia or an amine.

4. An aqueous coating material as claimed in claim 1, which contains, as component (B), calcite, dolomite, calcium ferrites, calcium molybdates, calcium oxide-modified aluminates, calcium oxide-modified silicates or aluminum silicates and mixtures thereof.

5. An aqueous coating material as claimed in claim 1, which contains, as component (C), a monoester of phosphoric acid whose alcohol component is derived from a compound of the formula

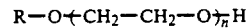

where R is $C_6$-$C_{18}$-alkyl and n is from 3 to 25.

6. The aqueous coating material as claimed in claim 2, wherein after said copolymer is dispersed in water, the excess solvent is then distilled off.

7. The aqueous coating material as claimed in claim 3, wherein after the mixture of I and II is dispersed, excess solvent is then distilled off.

8. An aqueous coating material as claimed in claim 1, which contains, as component (B), chalk.

* * * * *